United States Patent [19]

Boone et al.

[11] 4,049,974

[45] Sept. 20, 1977

[54] PRECHARGE ARITHMETIC LOGIC UNIT

[75] Inventors: Gary W. Boone; Jerry L. Vandierendonck, both of Houston, Tex.

[73] Assignee: Texas Instruments Incorporated, Dallas, Tex.

[21] Appl. No.: 441,917

[22] Filed: Feb. 12, 1974

Related U.S. Application Data

[63] Continuation of Ser. No. 176,667, Aug. 31, 1971, abandoned.

[51] Int. Cl.$^2$ ........................................... H03K 19/08
[52] U.S. Cl. ................................. 307/205; 307/216; 307/251; 340/146.1 AG
[58] Field of Search ............... 307/205, 251, 304, 216, 307/246; 340/146.1 AG

[56] References Cited

U.S. PATENT DOCUMENTS

| | | | |
|---|---|---|---|
| 3,252,011 | 5/1966 | Zuk | 307/216 X |
| 3,439,185 | 4/1969 | Gibson | 307/205 |
| 3,560,764 | 2/1971 | McDowell | 307/205 X |
| 3,601,627 | 8/1971 | Booher | 307/205 |
| 3,602,705 | 8/1971 | Cricchi | 307/205 X |
| 3,604,944 | 9/1971 | Gundersen | 307/216 X |
| 3,619,646 | 11/1971 | Vittoz | 307/205 X |
| 3,624,423 | 11/1971 | Borgini | 307/205 X |
| 3,638,047 | 1/1972 | Klein | 307/246 X |
| 3,649,844 | 3/1972 | Kroos | 307/216 |

*Primary Examiner*—John S. Heyman
*Attorney, Agent, or Firm*—Harold Levine; René E. Grossman; John G. Graham

[57] ABSTRACT

A computing system includes a central processor unit (CPU) in combination with external memory units. The CPU includes, on a single chip, an arithmetic logic unit (ALU), an instruction register, a random access memory and a control system. Interconnection of the functional elements of the CPU is accomplished via sequential use of a common parallel buss. The ALU contains precharged parity and carry propagate circuits which enhance circuit speed. The precharged circuits are formed using conventional insulated-gate-field-effect transistor fabrication techniques.

6 Claims, 9 Drawing Figures

PRECHARGE ARITHMETIC LOGIC UNIT

This is a continuation of our prior copending application, Ser. No. 176,667, filed Aug. 31, 1971, now abandoned.

This invention pertains to computing systems in general, and more particularly to improved parity and carry propagate circuits of an arithmetic logic unit.

A major problem associated with computing systems pertains to the arithmetic logic unit. Typically, complex multi-level logic is required to enable the unit to perform the required arithmetic operations. This complex logic requires a considerable amount of space on a chip. More significantly, precharge techniques cannot conveniently be used with multi-level logic. This significantly reduces the speed of operation of the ALU. The portions of the ALU that this has a major impact upon are the carry propagate circuit and parity. With respect to the carry propagate, speed of operation of this circuit limits the speed of the ALU since any add or subtract operation requires this circuit. A conventional complex logic carry propagate circuit may typically have an operation speed of 300 kh$_z$ or less.

Accordingly, an object of the invention is to provide an insulated-gate-field-effect-transistor carry propagate circuit that may be completely precharged to enhance speed of operation.

A further object of the invention is to provide an insulated-gate-field-effect transistor precharged parity circuit.

In accordance with the present invention a computing system includes a central processing unit (CPU) in combination with external memory units. The CPU is integrated on a single chip, and includes an arithmetic logic unit (ALU) for performing, in the preferred embodiment, eight separate arithmetic logic functions. The ALU includes precharged carry propagate and parity circuits which provide advantages that include higher speed, lower cost, and reduced area.

In one aspect of the invention a precharged parity circuit generally includes two columns of interconnected field-effect-transistors (FET), the columns respectively having outputs corresponding to even parity and odd parity. In the odd parity column two pair of connected IGFETs are connected in parallel between a first node and a first phase of a clock signal. One pair of transistors respectively have gates connected to a first input logic signal and the inverted level of a second signal. The other pair of transistors respectively have gates for receiving the second logic signal and the inverted level of the first signal. The first node is connected by an IGFET to a negative voltage source, the gate of the IGFET being connected to said one phase of the clock. The input signals are applied during phase one of the clock becoming a logic zero, logic one corresponding to the most positive level of the signal. During this phase one the node will be precharged through the IGFET having phase one connected to its gate. Since the parallel combination of IGFETs are connected to phase one of the clock, the node will precharge regardless of the logic levels of the first and second inputs. At the end of phase one the node will discharge if the inputs were opposite—i.e., one logic 0, one logic 1. This will produce a logic 1 at the node signifying odd parity.

Similarly, the second column has a parallel combination of series connected IGFETs connect to a second node and phase one of the clock. In this column, however, the inputs to the IGFETs are such that the node discharges if the inputs are of like logic levels. Hence a logic 1 corresponds to even parity.

As many logic inputs as desired may be checked for parity by adding to each column another pair of IGFETs for each additional input, and means for precharging the resulting node. For example, to check a third input for parity an IGFET would be connected between the first node and a third node, in the first column, and said second node and a fourth node in the second column. These IGFETs would have a gate input for receiving the third signal. Additionally IGFETs would be connected respectively between the first and fourth nodes, and the second and third nodes, having gates for receiving the inverted level of the third signal. Thus, either the third or fourth nodes will be discharged, signifying odd or even parity.

In another aspect of the invention a propagate carry circuit comprising IGFET devices is provided. The circuit includes means for precharging the carry terminal of each ALU bit during one phase of the clock. The terminal is selectively discharged depending upon the logic level of the output resulting from an add or subtract operation. If a carry propagate is required, the output will enable an IGFET connected between the carry terminal and phase one of the clock to discharge. Since the IGFET for discharging the terminal is connected to phase one of the clock, the control signal containing the result of an arithmetic operation may be applied simultaneously with the precharge cycle. This enables maximum speed of operation.

Other advantages and objects of the invention will be apparent upon reading the following detailed description of an illustrative embodiment of the invention in a computing system in conjunction with the drawings wherein:

FIG. 9 is a logic diagram illustrating the logic of exclusive OR.

The central processing unit (CPU) integrated on a single semiconductor chip, in which the arithmetic logic unit of the invention may be used, is described in detail in copending application Ser. No. 176,668, filed Aug. 31, 1971 by Gary W. Boone for "COMPUTING SYSTEM CPU", assigned to the assignee of this invention, such application being incorporated herein by reference.

ARITHMETIC LOGIC UNIT

Figure 1:
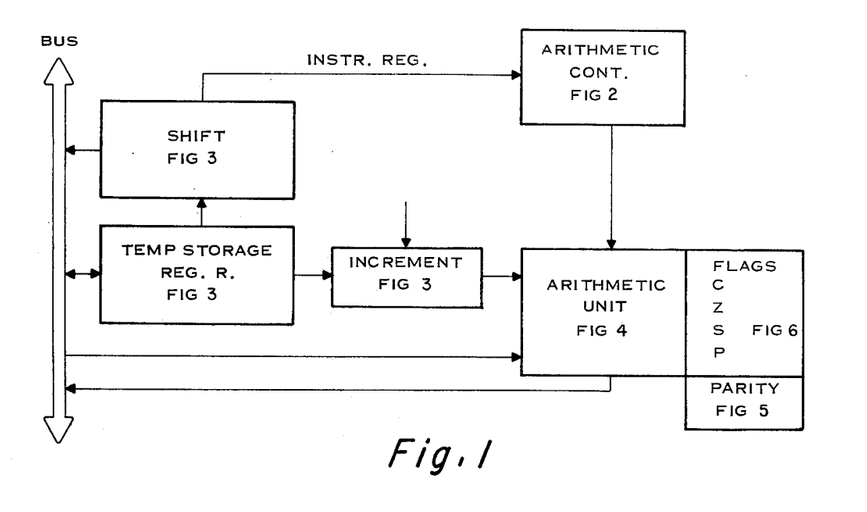
FIG. 1 is a functional block diagram of the arithmetic logic unit of the CPU.

This section will describe the operation and logic of the arithmetic logic unit on the CPU chip. A functional block diagram of the ALU is shown in FIG. 1. Each functional block is labelled with a figure number where the detailed circuit description for that function is described. The arithmetic unit contains a temporary storage register, a section for shifting the accumulator, and an increment section for the program address (FIG. 3), the arithmetic operand control (FIG. 2), the arithmetic unit (FIG. 4), and the arithmetic flags (FIG. 6), including the parity circuit (FIG. 5).

CONTROL SECTION

Figure 2:
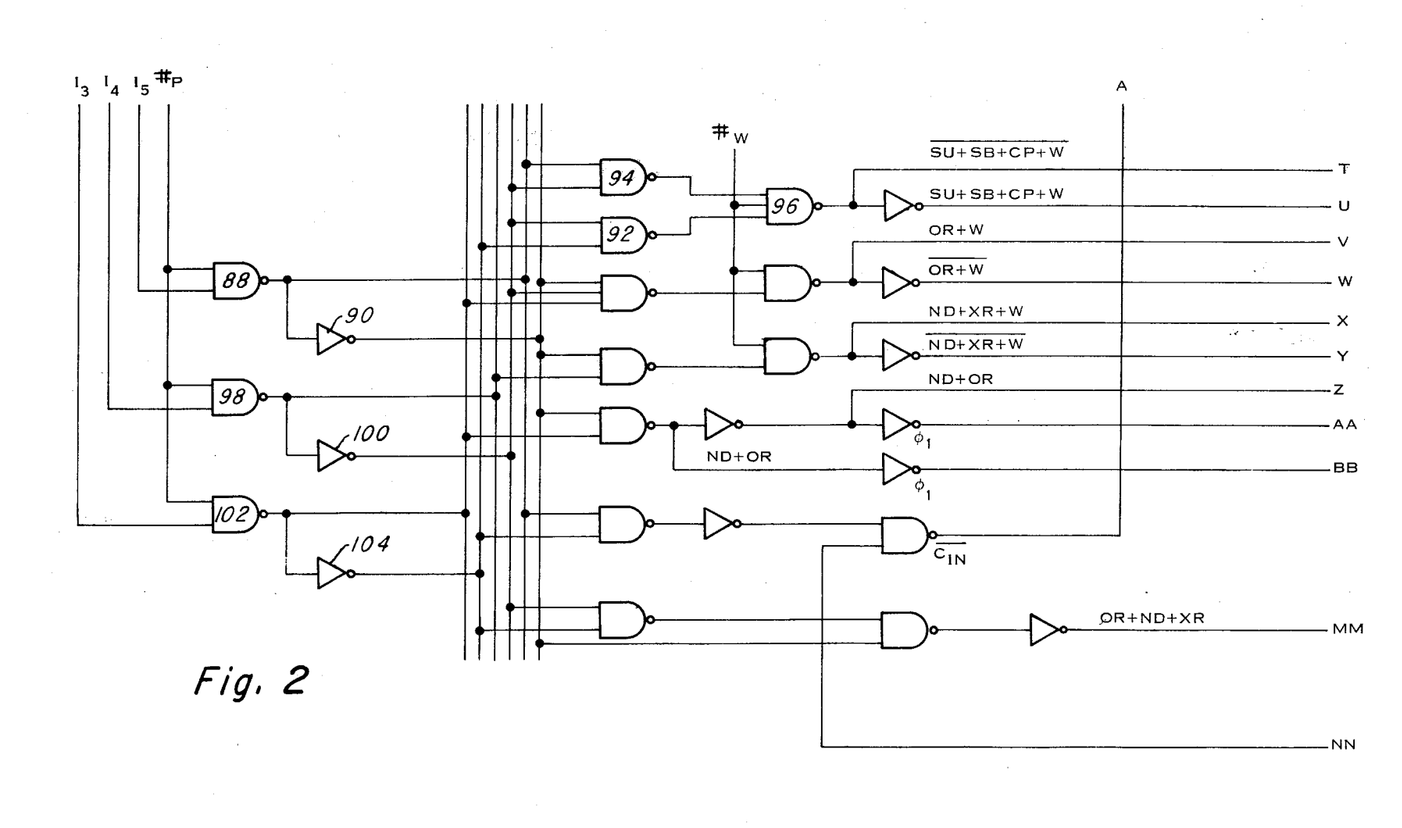
FIG. 2 is a logic diagram of the arithmetic control section of the ALU.

Operation of the arithmetic control section, FIG. 2, is as follows. By way of example, consider instruction bit $I_3$, $I_4$, and $I_5$ to be true, i.e., logic 1. This coding corresponds to the instructions compare (reference Table V in said application Ser. No. 176,668). A control signal $\#\overline{P}$ which is generated by the state timer of the CPU (described in FIG. 8 in said application Ser. No. 176,668) to update the address register after an instruction is applied as one input to NAND gates 88, 98, and 102. The other input to these NAND gates is respectively bits $I_3$, $I_4$, and $I_5$ of the instruction register. When the control signal $\#\overline{P}$ is a 1, the output of gate 88 will be a logic 0 because $\#\overline{P}$ and $I_5$ are both 1's. The output of the inverter 90 will be a logic 1. The logic 0 of NAND gate 88 ensures a logic 1 at the output of the NAND gate 94 since at least one of its inputs is a 0. The NAND gate 96 thus has one input that is a logic 1. The second input to NAND gate 96 is from the control $\#\overline{W}$. This control must be a 1 to assure that the bootstrapped load on the NAND gate 96 will continually refresh its capacitance. It is understood by those skilled in the MOS art that a bootstrapped load may be used to drive a large capacitance on the output of a device. The capacitance must be continually refreshed or the logic value will drift from its true value.

Because the output of gate 94 and $\#\overline{W}$ are both logic 1's, the output of NAND gate 92 will determine the logic level output of gate 96 (for the present example). The NAND gate 92 receives inputs from both the inverter 101 and 100 which, in turn, respectively receive inputs from NAND gates 102 and 98. For the present example where instruction bits $I_3$, $I_4$, and $I_5$ are logic 1's, the output of NAND gates 98 and 102 are 0's, producing an output from inverters 100 and 104 that are respectively logic 1's. These logic 1 signals control the NAND gate 92, producing a logic 0 output there from. Thus, the output of NAND gate 92 is controlled to be a logic 1 selecting the control signal "SU or SB or CP or W" to be a logic 1, causing the compare instruction to be executed. Similar examples can be shown for the other seven arithmetic operations; i.e., by changing the logic of instruction bits $I_3$, $I_4$ and $I_5$ the other arithmetic operations may be selected.

The arithmetic unit control and operation will continually do the instruction code present in the instruction register (bits 3, 4 and 5) although an arithmetic instruction may not be executed. The only time the results of the arithmetic operation will be sampled will be when a *F control signal from the control decode is present. This may be seen by reference to FIG. 7, which illustrates one bit of the arithmetic unit. Gate 86 is the control for generating the bus from the arithmetic unit. If the control signal *F is a logic 1, the bus will be generated during phase 2 of the clock. During the logic 0 of phase 1, the transfer gate 106 will transfer the *F logic 1 command to the input of the NAND gate 86. Since phase 1 is a logic 0, the output of the gate 86 will remain at logic 1 as long as phase 1 remains logic 0. When phase 1 goes to logic 1, however, gate 86 is enabled such that a logic 0 is outputed. A logic 0 on the input of NOR gate 84 (which is part of the precharged bus) will transfer the output 108 ($F_n$) of the arithmetic unit to the bus during phase 2; that is, when $F_n$ is logic 1, the signal $\overline{F_n}$ is logic 0, producing a logic 0 at the input of NOR gate 84. Since both inputs to NOR gate 84 are now 0's, a logic 1 output is produced on the bus.

Figure 7:
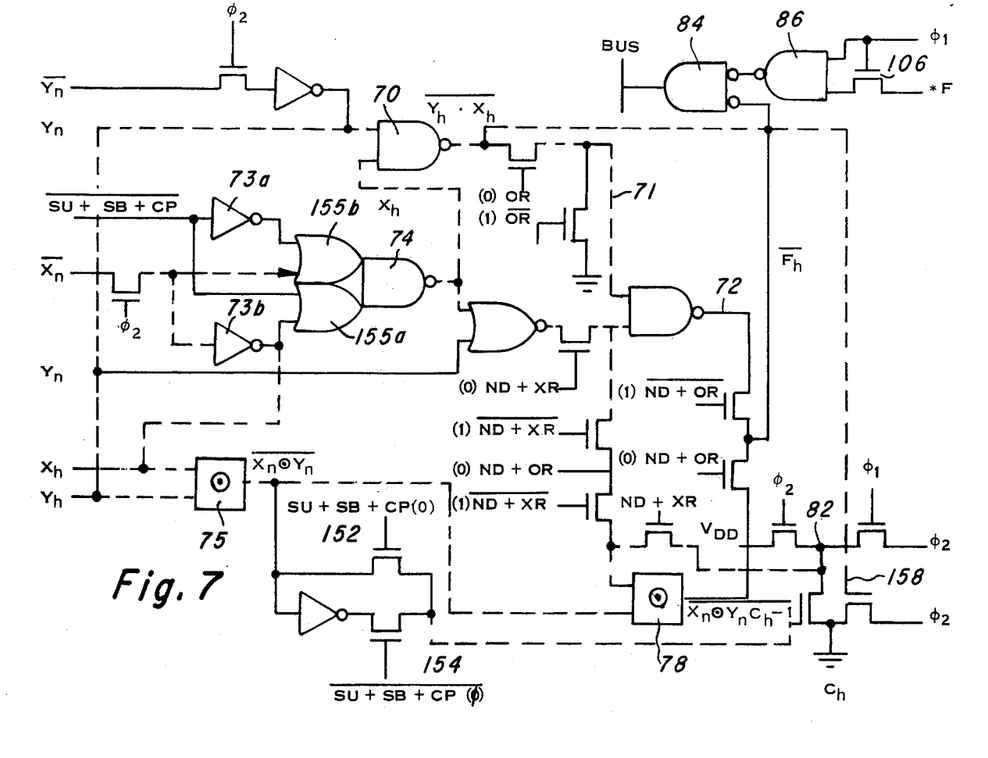
FIG. 7 is a logic diagram illustrating the arithmetic operation add.

Since the signal *F will be a logic 0 during the next phase 1, the gate 84 will not be enabled until further *F signals occur. The times at which the signal *F occur are shown in Table VIII in said application Ser. No. 176,668. It may be seen that the signal F occurs only during phase 1 of states 2 and 4, for both execute and fetch subcycles. As an example, consider subcycle fetch, state S4, phase 1. To simplify the control, the signal *F occurs for every instruction at this time. At some times, such as cycle C2A, the results of the arithmetic unit are not desired. This is indicated by a blank spot in the Table VIII during the phase 2 time of that state. The result of the arithmetic unit will not be stored in any register at that time.

TEMPORARY STORAGE REGISTER

Figure 3:
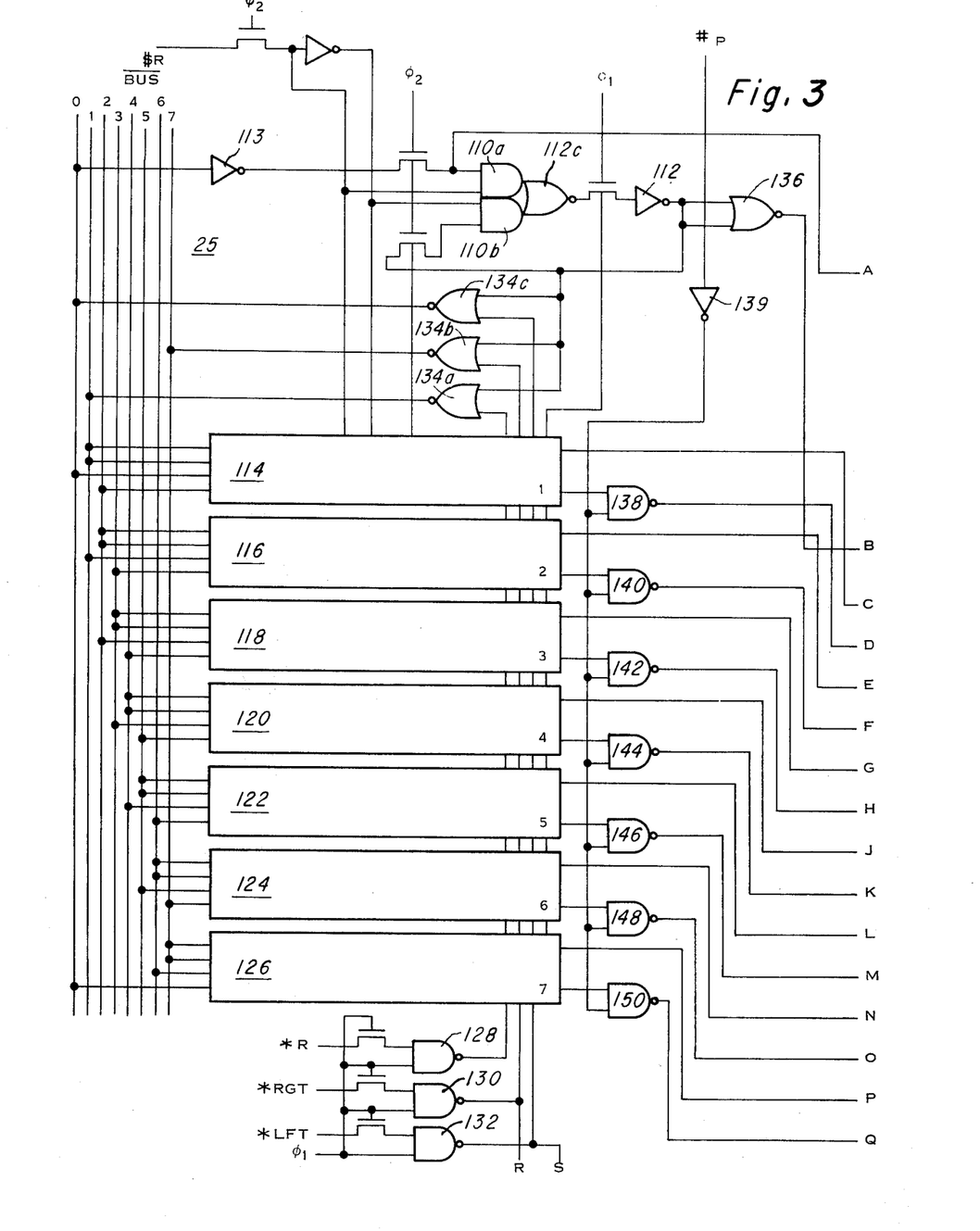
FIG. 3 illustrates the logic of the temporary storage register, shift circuitry, and increment logic.

The temporary storage register of the CPU is shown in FIG. 3. The logic of one bit of the storage register is illustrated, other bits of the temporary storage register are shown generally in block diagram form at 114, 116, 118, 120, 122, 124, and 126. The internal bus is shown at 25 as having lines 0 through 7. Signals on these lines are inverted signals as indicated by the label $\overline{BUS}$.

Operation of the storage register is as follows. If the control signal $R becomes a logic 1, the complex gate 110 which includes NAND gate 110A, 110B, and NOR gate 110C will be enabled through the $\overline{BUS}$ input line 0. The output will be stored at the output node of the logic gate 110 until the following phase 1 clock signal. During phase 1, it will be transferred through the inverter gate 112. The output of gate 112 will be transferred back through gate 110B on phase 2 if the control signal $R is now a logic 0. That is, if the signal $R is a logic 0, both inputs to the NAND gate 110B are logic 1's producing a logic 1 output therefrom. This logic 0 is inverted by gate 112 and recirculated. This transfer will continue until the control signal $R becomes a logic 1 again. The inverter 113 inverts the $\overline{BUS}$ signal on the internal bus 25 so that a true signal is applied to the logic gate 110.

The temporary storage register is also used for the shift right and shift left instructions, or for normal operation. This is controlled by the control signals *R, *RGT and *LFT. If a right shift is desired, the data on bus line 0 will be shifted to line 1. During phase 2 of the clock, after the signal *RGT becomes a logic 1, the shift will occur as follows. The bus line 0 is shifted to line 1 by shifting the logic value of the output of the inverter 112 onto the bus line 1 when control signal 130 is a logic 0. By way of example, if a true signal were present on bus line 0, this would be represented there as a logic 0 since the bus 25 is inverted. The logic 1 would be present at the output of inverter 112 representing the true data value. The NOR gate 134A thus has an input 130 of logic 0 and an input from inverter 112 of logic 1, producing an output on inverted bus line 1 of logic 0, effecting the shift right.

Similarly, if the shift left were required, a logic 1 input *LFT would provide an output 132 that would be applied to one of the inputs to the NOR gate 134B. The other input to the NOR gate 134B would be the output of the inverter 112. The output of the NOR gate 134B is connected to bus line 7. Thus, for a shift left, the signal on bus line 0 is shifted to bus line 7.

If normal operation were desired, the input *R going to a logic 1 would produce an output 128 that would be applied to the NOR gate 134C. This would recirculate the data on the bus line 0 back to bus line 0.

Circuitry for incrementing the program address is also illustrated in FIG. 3. The signal for accomplishing a program address increment is the control signal #P. As mentioned previously, the signal is generated by the state timer circuitry described with reference to FIG. 8 in said application Ser. No. 176,668. If the control signal #P is a logic 1, the output of NOR gate 136 will be a logic 0. The output of NAND gate 138, 140, 142, 144, 146, 148 and 150 will be a logic 1 since the #P signal is inverted by the inverter 139. This will ensure that the complement of 1 is added through the arithmetic unit. This is done because the input to the arithmetic unit, gates 136 through 150, are inverted inputs. The incrementing occurs during the fetch subcycle, state 1, and the fetch subcycle state 3. The incremented output occurs during state times S2 and S4 of the fetch subcycle.

ARITHMETIC UNIT

Figure 4:
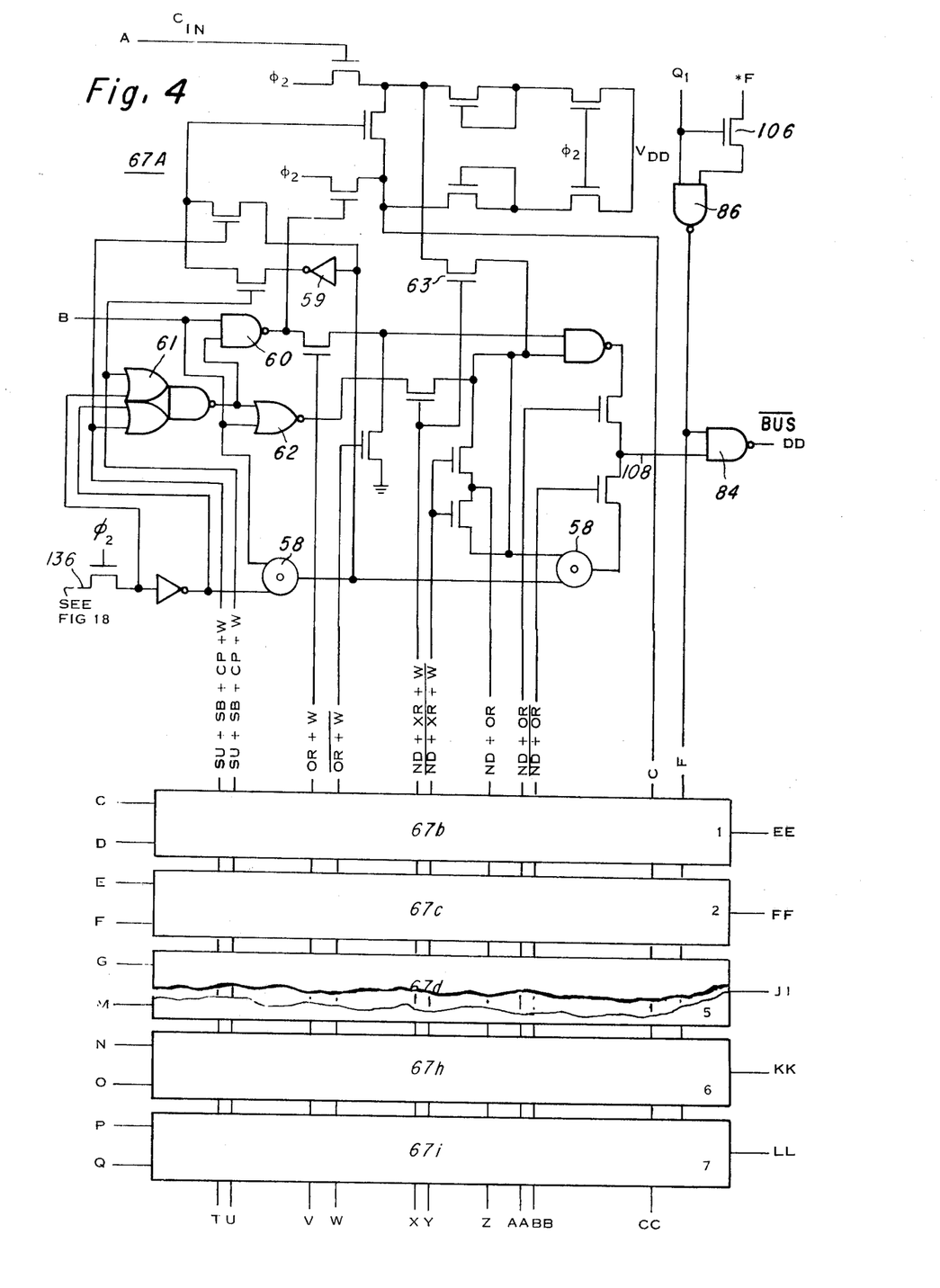
FIG. 4 is a logic diagram of the arithmetic unit.
Figure 5:
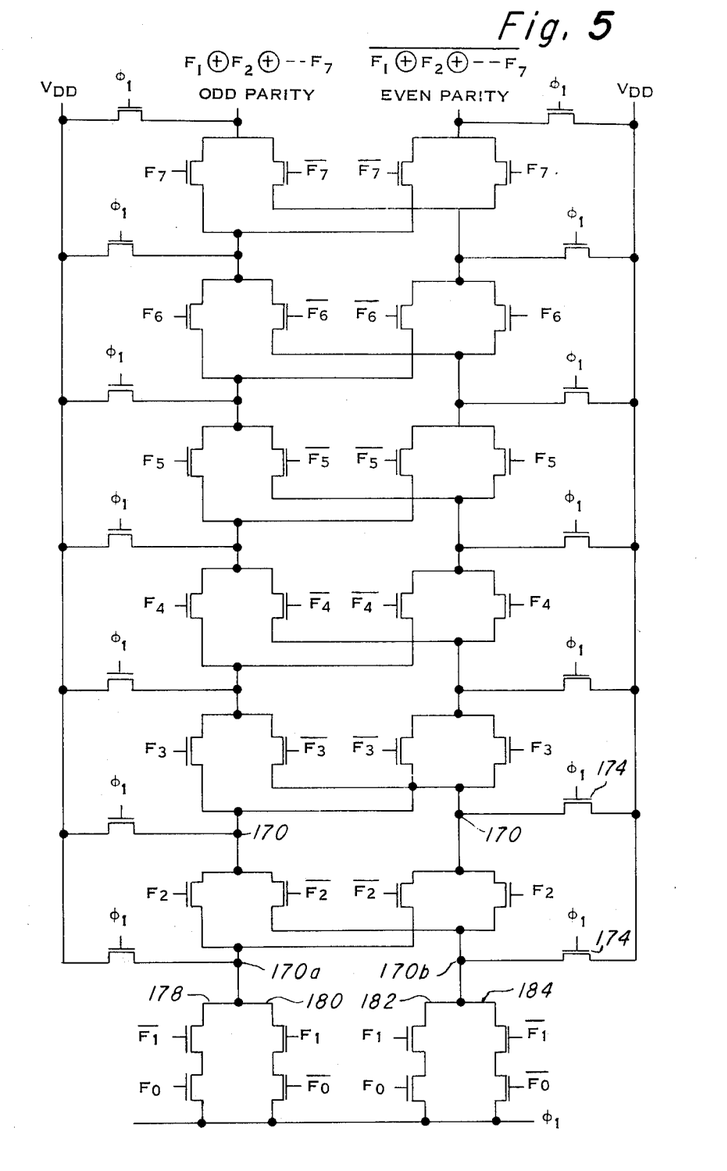
FIG. 5 is a schematic of an 8-bit parity precharge circuit used in accordance with the present invention.

With reference to FIG. 4, there is illustrated one bit of the arithmetic unit in logic form generally at 67A. The other seven bits of the arithmetic unit are shown in block diagram from at 67B through 67I. The arithmetic unit comprises inverters shown generally at 59, complex gate 61, NAND gates 60, NOR gates 62, ring dot gates 58 (which are the inverse of exclusive ORs) and transfer gates 63. These logic gates are interconnected such that in response to a preselected code on instruction bits $I_5$, $I_4$, and $I_3$, eight separate arithmetic operations may be effected. Operation of the logic in performing an add instruction is shown in FIG. 7. The logic associated with the subtract instruction and exclusive of instructions are shown respectively in FIGS. 8 and 9.

With reference now to FIG. 7, description of the logic of one bit of the arithmetic logic unit in performing an add instruction will be described if an add instruction is desired, the control signal 152 will be a logic 0. This signal is labelled SU + SB + CP + W. It will be recalled that this signal is generated by the arithmetic logic unit control circuit described previously with respect to FIG. 2. With reference to FIG. 2, it may be seen that if the instruction bits $I_5$, $I_4$, and $I_3$ are respectively 000, the code corresponding to add (reference Table V in said application Ser. No. 176,668) then the output of AND gate 96 will be a logic 0. Hence, the control signal 152 is 0 when an add instruction is desired. Similarly, the inverse of the control signal 152 labelled 154 in FIG. 7, is a logic 1.

Signal 154 is applied to the OR gate 155A and the inverter 73A. The output of the inverter 73A is applied to one input of the OR gate 155B. The input signal $\overline{X_n}$ which is outputed from the temporary storage register illustrated in FIG. 3, is applied directly to the other input of the OR gate 155B. The signal $\overline{X_n}$ is inverted by inverter 73B to produce the true signal $X_n$ which is applied to the other input of the OR gate 155A and also to an input of the ring dot gate 75. The logic 1 level of the control signal 154, i.e., $\overline{SU + SB + CP}$ enables operation of the arithmetic unit. The output of the NAND gate 74 will be bit $X_n$. For example, consider a situation where the bit $X_n$ from the temporary storage register such as 114 in FIG. 3, is a logic 1. For this situation, when the control signal 154 goes to a logic 1, the inputs to the OR gate 155B are logic 0 from the inversion 73A and 0 from the signal $\overline{X_n}$. This produces an output of the OR gate 155B of a logic 0, which forms one input to NAND gate 74. Further, one input to the OR gate 155A is a logic 1 corresponding to the control signal 154. The other input to the OR gate 155A is a logic 1 corresponding to the true value of the bit $X_n$. This produces an output of the OR gate 155A of a logic 1, which is also an input to the NAND gate 74. Thus, NAND gate 74 has inputs of 0 and 1 corresponding to an output of a logic 1 which, in turn, is a logic level assumed for the bit $X_n$. In a similar manner, it may be shown that where the logic bit $X_n$ is a 0, a logic 0 will be produced at the output of NAND gate 74.

The inverse of the exclusive or of bit $X_n$ and $Y_n$ will be formed by the circle dot gate 75, one input of which is the signal $X_n$ taken from the output of the inverter 73B, and the true signal Y. The output of the gate 75 is labelled $\overline{X_n \oplus Y_n}$. This output is part of the sum and carry of the sum $X_n$ and carry $C_n$. The carry will first be traced. The output of gate 70 will be the NAND sum of X and Y. This output is shown as $\overline{X_n \cdot Y_n}$. If these bits $X_n$ and $Y_n$ are both logic 1, a carry must be generated. This is accomplished since logic 1 inputs to the NAND gate 70 effecting a logic 0 output which is effective to operate the transfer gate 158, generating a carry ($C_n$) signal since clock phase 2 is normally a logic 1 level. If a carry is not generated, then a carry may be propagated by the inverse of the exclusive or $X_n$ or $Y_n$, shown at the output of gate 75. This occurs because the output $\overline{X_n \oplus Y_n}$ is transferred through gate 176 to logic gate 160. The carry will be propagated from note 92 through gate 160 to the next but $C_n$. The input to gate 82 will be either $C_{n-1}$ or a generate from the NAND term $X_{n-1}$ and $Y_{n-1}$.

The sum $F_n$ is expressed as $F_n = X_n \oplus Y_n + C_{n-1}; C_n = X_n \cdot Y_n + C_{n-1}(X_n \oplus Y_n)$. The sum $F_n$ will be generated through the inverse exclusive OR gate 78 and will be the exclusive or of the carry $C_{n-1}$ and exclusive or of $X_n$ or $Y_n$. The sum term at the output of gate 78 generates the bus if a *F occurs for that time frame at NAND gate 86.

Figure 8:
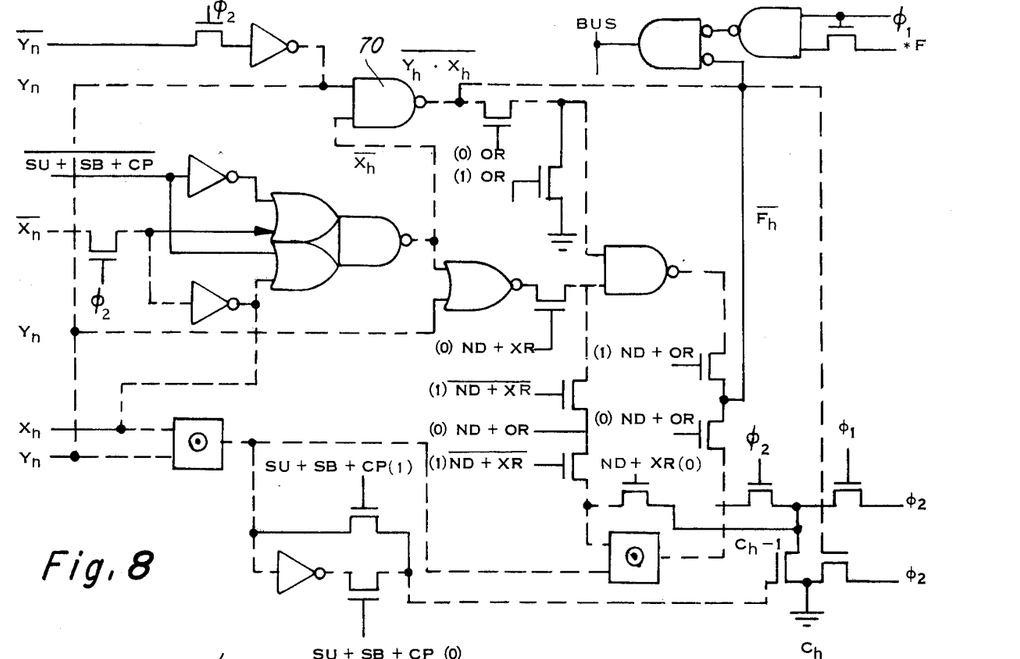
FIG. 8 is a logic diagram illustrating the arithmetic logic for subtract.

FIG. 8 shows the operation of the ALU logic to effect subtraction. As may be seen from the sum term $F_n = X_n \oplus Y_n \oplus C_{n-1}$, the difference is the same for subtract as add. The only difference between operation of the two circuits is that the $X_n$ input to the carry equation is inverted. This may be seen at the output of the NAND gate 70, where the output is shown as $\overline{Y_n \cdot X_n}$. Otherwise, operation of the subtract logic is the same as for add as described with reference to FIG. 7.

Figure 9:
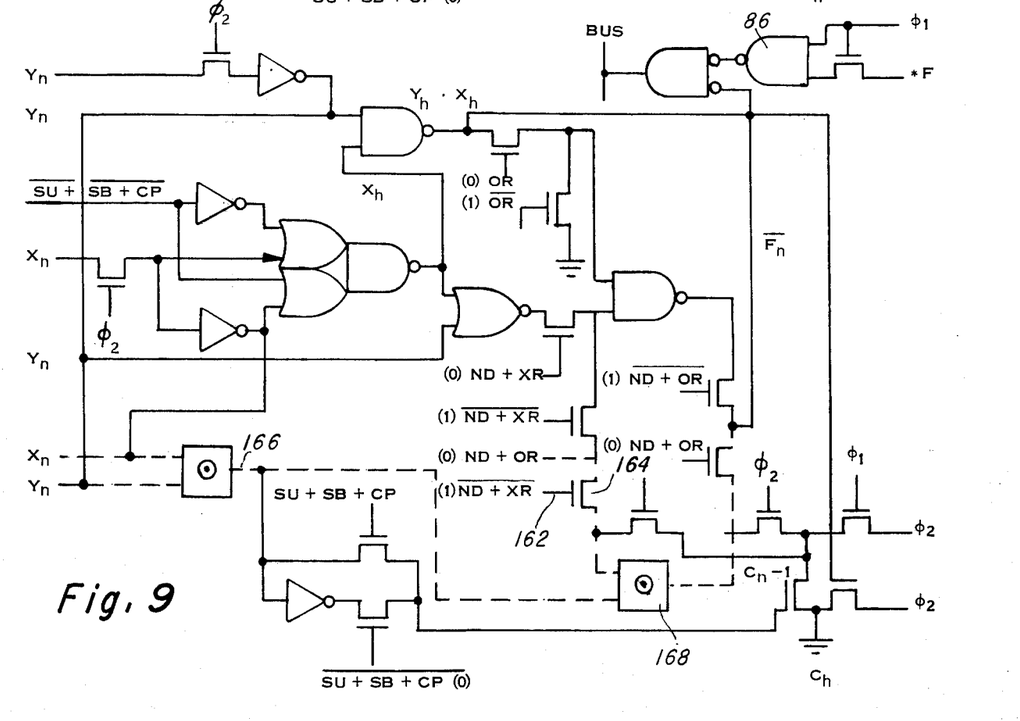

With respect to FIG. 9, operation of an exclusive or instruction will be described. For this example, the sum $F_n$ is equal to $X_n \oplus Y_n$. For an exclusive or operation, the signal XR must be a logic 1. This signal will be generated when the instruction bits $I_3$, $I_4$, and $I_5$ are respectively 101 (Reference Table V). With reference back to FIG. 2, it may be seen that such a coding for instruction register bits $I_3$, $I_4$, and $I_5$ will produce a logic 1 at the output of the NAND gate 96A, producing an output signal XR that is a logic 1. The signal $\overline{ND + XR}$ is applied to the transfer gate 164. This signal will be a logic 0 when the signal "ND + XR + W" is a logic 1. The transfer gate 164 will be activated by the signal 162 such that a logic 1 is transferred to the input of gate 168. The signal 166 is the inverse of exclusive or of the two terms $X_n$ and $Y_n$. The inverse of this exclusive or will be combined with the logic 1 present at the input of gate 168. The output of gate 168 forms the exclusive or of the terms $X_n$ and $Y_n$. This output will be gated onto the bus when the control signal *F is a logic 1 at the NAND gate 86.

In a similar manner, the logic associated with the other arithmetic operations may be traced through the logic of the arithmetic unit.

PARITY CIRCUIT DESCRIPTION

A precharged parity circuit in accordance with the present invention includes the advantage of increased speed of operation. This circuit will be described with reference to FIG. 5. The parity circuit includes precharged insulated gate field effect transistors shown generally at 174, having gate inputs labelled phase 1. Inputs from the buss are labelled F and $\overline{F}$. For the illustrative 8-bit parity circuit of FIG. 5, there are eight F signals, $F_0$ through $F_7$, and eight $\overline{F}$ signals, $\overline{F}_0$ through $\overline{F}_7$. These inputs are selectively applied to gate of interconnected insulated gate field effect transistors to produce odd parity and even parity outputs.

Operation of the precharged parity circuit is as follows. During phase 1 of the clock, nodes shown generally at 170 are precharged to a reference voltage $V_{DD}$. During the high part of clock; that is, when transistors 174 are non-conductive, nodes 170 are conditionally discharged depending on the inputs $\overline{F}$ and F to the parity circuit. By way of example, node 170A would be discharged if $\overline{F}_1$ and $F_0$ were both logic 0's, or if $F_1$ and $\overline{F}_0$ were both logic 0's. With reference to node 170B, the inverse occurs, i.e., node 170B discharges if inputs $F_1$ and $F_0$ are both logic 0's or if inputs $\overline{F}_1$ and $\overline{F}_0$ are both logic 0's. Thus, the function of the inputs at 178 may be expressed as $\overline{F}_0 \cdot \overline{F}_1$, the function at 180 as $\overline{F}_1 \cdot F_0$; the function at 182 as $\overline{F}_1 \cdot \overline{F}_0$; and the function at 184 as $F_1 \cdot F_0$. The functions 178 and 180 are combined at node 170A to result in the exclusive or function $F_0 \oplus F_1$. Similarly, the functions 182 and 184 are combined at node 170B to yield $\overline{F_0 \oplus F_1}$. In other words, the node 170A will be discharged only if signals $F_0$ and $F_1$ are opposite logic levels. If both inputs are logic 1's, or if both are logic 0's, the node will not discharge. Similarly, the inverse is true for node 170A; i.e., the node will not discharge for the situation where the signal $F_0$ and $F_1$ are opposite. Parity is the exclusive or of all of the bits that parity is to be checked for. The circuit can be expanded for as many bits as desired. Parity is the exclusive or term. The inverse of exclusive or is called even parity.

ARITHMETIC FLAGS

Figure 6:
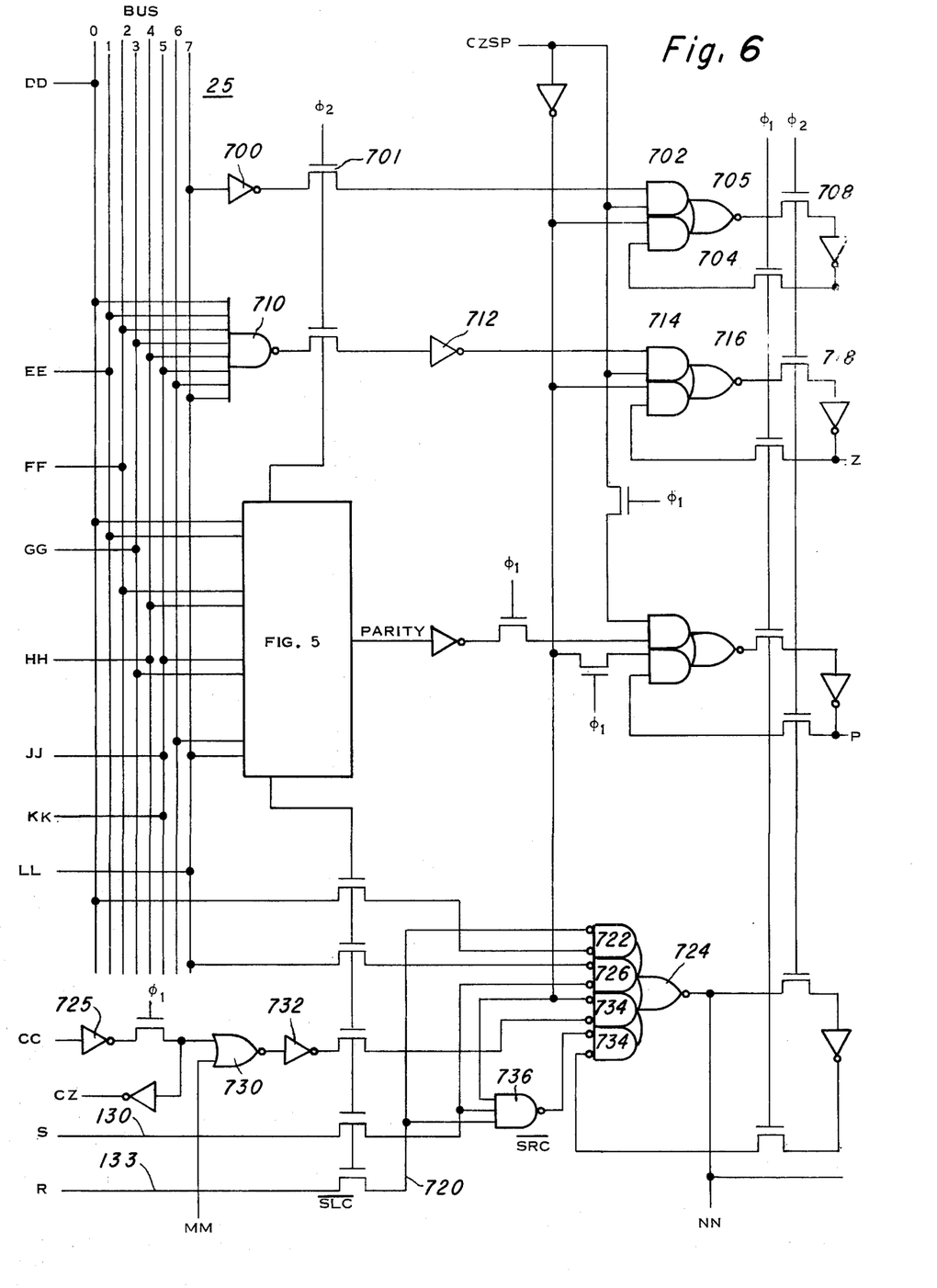
FIG. 6 illustrates the logic associated with the arithmetic flags of the ALU.

The arithmetic unit flags carry (C), zero (Z), sign (S) and parity (P) will be described with reference to FIG. 6. The sign flag indicates the status of bit 7 of an arithmetic sum. If bit 7 is a logic 1, the sign flag will be true; if bit 7 is a 0, the sign flag will be false. Operation is as follows. Consider first the example where bit 7 is a logic 1. It will be noted that the bus shown generally at 25 is inverted. Thus, a logic 1 for bit 7 will be present on line 7 as a logic 0. This logic 0 is inverted by the inverter 700 to produce a true data bit signal. This logic 1 will be transferred on phase 2 of the clock by the transfer gate 709 to form one input of the AND gate 702. The other input of the AND gate 702 is formed by the control signal #CZSP. When this control signal goes to a logic 1, the output of AND gate 702 is a logic 1. This ensures that the output of the NOR gate 706 is a logic 0. On the subsequent phase 1 of the clock, this logic 0 is inverted by the inverter 708 to form the true or logic 1 output of the sign flag. This logic 1 is transferred back through the transfer gate 709 on phase 2 of the clock to form one input of the AND gate 704. If the control signal #CZSP goes to a logic 0, the other input to the AND gate 704 will be a logic 1. This will ensure that the logic 1 level of the sign flag will recirculate until $\overline{BUS}$ 7 is again sampled. Similarly, if the data on bus bit 7 is a true logic 0, the inverted signal logic 1 will be present on the inverted bus. This logic 1 will be inverted by the inverter 700 to form a logic 0 as an output of the inverter 700. This logic 0 is transferred by the transfer gate 701 during phase 2 of the clock to one input of the AND gate 702. A 0 input to the AND gate ensures that the output of the AND gate 702 is also a 0. Similarly, when the control signal #CZSP goes to a logic 1, it is applied as one of the inputs of AND gate 704, ensuring a logic 0 output therefrom. Thus, both inputs to the NOR gate 706 are logic 0's, producing an output that is a logic 1. This logic 1 output is transferred during phase 1 by the transfer gate to the inverter 708 which produces a logic 0 output as the sign flag corresponding to the zero level of bit seven of the bus.

The zero flag indicates that all of the inputs of the arithmetic unit are logic 0's; that is, bits 0 through 7 are all logic 0's. For example, for the situation where all of the bits 0 through 7 are 0's, a logic 1 will be present on these lines since the bus 25 is inverted. This will enable the NAND gate 710 producing a logic 0 output therefrom. This logic 0 output is inverted by the inverter 712 to provide a logic 1 as an input to the AND gate 714. The other input to the AND gate 714 is also a logic 1 when the control signal #CZSP is true. Thus, the output at the AND gate 714 is a logic 1 ensuring that the output of the NOR gate 716 is a logic 0. During phase 1 of the clock, the logic 0 output of the NOR gate 716 is inverted by inverter 713 such that the Z flag is a logic 1. Similarly, it may be seen if any of the bus bits 0 through 7 are logic 1's rather 0's, the output of the NAND gate 710 will be a logic 1, and the level of the Z flag will be 0.

The parity flag indicates that there is an odd number of 1 bits in the 8-bit output of the arithmetic unit. The details of the parity circuit itself were described with reference to FIG. 5. The logic for producing the parity output (P) in response to the control signal #CZSP going to a logic 1 is similar to that described with reference to the sign and zero flags.

The flag carry is updated if a carry out of bit 7 of the arithmetic unit occurs. The carry flag will also be updated for a shift right or shift left instruction. The other flags are not affected. A shift left operation will indicate the least significant bit of the 8-bit output after the shift. A shift right will indicate the most significant bit of the 8-bit output. By way of example, the control signal #SLC is the inverse of the control signal *LFT which controls a shift left command. Operation of this signal was described with reference to FIG. 3. When the signal *LFT becomes a logic 1, this generates shift left command. Thus, the control signal $\overline{SLC}$ is a logic 0. This logic 0 is applied as an input to the NOR gate 722. As may be seen, the other input to the NOR gate 722 samples the least significant bit, bit 0, of the bus 25. If this bit is a logic 1, it will be represented on the bus bit 0 as a logic 0 since the bus is inverted. The logic 0 will enable the NOR gate 722 to provide a logic 1 output. This will be sampled through the OR gate 724 providing a carry sign of logic 1. Similarly, it may be seen that the NOR gate 726 samples the most significant bit, i.e., bus bit 7 after a shift right instruction.

The carry flag is also set if a carry out of bit 7 in the arithmetic unit occurs. For this situation, a logic 1 is applied to the input of the inverter 728. This is clocked during phase 1 to an input of the NOR gate 730 producing a logic 0 at this input. The output of NOR gate 730 will be a logic 1 if the other input to the gate is a logic 0. With reference back to FIG. 2, it may be seen that the other input to the NOR gate 730 will be a logic 0 for the situation where the instruction bits $I_3$, $I_4$, and $I_5$ are respectively 110, 010, 100, or 111, the codes corresponding to the arithmetic operations OR, SU, ND, and CP. The logic 1 output of NOR gate 730 is inverted at 732 to provide a logic 0 input to the NOR gate 734. The other input to the NOR gate 732 is an inverted control signal #CZSP. Thus, when this control signal goes to a logic 1, its inverse, logic 0, is applied to the NOR gate 734 producing a logic output therefrom. This logic output is sampled through the OR gate 724 to produce a logic 1 carry flag. This signal is connected to the control portion of the ALU illustrated in FIG. 2 to generate the signal $\overline{C_{in}}$. It may be seen that the value of $\overline{C_{in}}$ will be a logic 0 when the carry flag is a logic 1 and instruction bit $I_3$ is a 1 and the instruction bit $I_5$ is a 0. The signal $\overline{C_{in}}$ is applied as an input to the arithmetic unit described with reference to FIG. 4.

The status of the carry flag will be recirculated by NAND gate 734 for the following situation. Assume, for purposes of illustration, that the carry flag is a logic 1. The output of the NOR gate 734 will recirculate the logic 1 when both of its inputs are logic 0's. One of its inputs is an inverted output from OR gate 724. The output of the OR gate 724 is a logic 1 for the situation where the carry flag is a logic 1 so its inverted level will be the required logic 0. The other logic 0 input to the NOR gate 734 is produced by the NAND gate 736. The output of the NAND gate 736 will be a logic 0 when all of its inputs are logic 1's. One of its inputs is the inverted control signal #CZSP. For the situation where this control signal is a logic 0; that is when it is not desired to update the status of the flags, then its inverted signal, logic 1, will be one of the inputs to the NAND gate 736. The other two inputs to the NAND gate 736 are respectively #SLC and #SRC, the signals corresponding to shift left and shift right instructions. For the situation where no shifts are desired, these signals will have a logic level of 1 since they are the inverse of the control signal specifying the shift instructions. Thus, when it is not desired to update the status of the flags, and when no shift instructions are being executed, the NAND gate 736 will have an output of logic 0, allowing the status of the carry flag to be recirculated.

We claim:

1. A circuit for determining the parity between a plurality of logic signals comprising:
    a. first pair of series connected field effect transistors connected between a first node and a first clock voltage source, said transistor having gates for receiving logic signals, and means for applying a first logic signal and the complement of a second logic signal to the gates of the field effect transistors, respectively;
    b. a second pair of series connected field effect transistors connected between said first node and said first clock source, said second pair of transistors having gates for receiving logic signals, and means for applying the complement of said first logic signal and said second logic signal to the gates of the second pair, respectively; and
    c. means for precharging said first node to a reference negative voltage simultaneously with applying said first and second signals whereby when said first and second signals are of opposite logic levels said node is discharged thereby producing at said node a logic 1 level corresponding to uneven parity.

2. A circuit as set forth in claim 1 wherein said means for precharging said first node includes a field effect transistor connected between said node and said reference negative voltage, the gate electrode of said transistor being connected to said first clock voltage source.

3. A circuit for determining the parity between a plurality of logic signals comprising:
    a. first pair of series connected field effect transistors connected between a first node and a first clock voltage source, said transistors respectively having gates for receiving a first logic signal and the complement of a second logic signal;
    b. a second pair of series connected field effect transistors connected between said first node and said first clock source, said second pair of transistors respectively having gates for receiving the complement of said first logic signal and said second logic signal;
    c. means for precharging said first node to a reference negative voltage simultaneously with applying said first and second signals whereby when said first and second signals are of opposite logic levels said node is discharged, thereby producing at said node a logic 1 level corresponding to uneven parity, said means for precharging said first node including a field effect transistor connected between said node and said reference negative voltage, the gate electrode of said transistor being connected to said first clock voltage source;
    d. a third pair of series connected field effect transistors connected between a second node and said first clock source, respectively having gates for receiving said first and second logic signals;
    e. fourth pair of series connected field effect transistors connected between said second node and said first clock source, respectively having gates for receiving the complement of said first and second logic signals; and
    f. means for precharging said second node to a reference negative voltage simultaneously with applying said first and second signals whereby when said first and second signals are of like logic levels said second node is discharged producing at said second node a logic 1 level corresponding to even parity.

4. A parity circuit as set forth in claim 3 wherein said means for precharging said second node includes a second insulated-gate-field-effect-transistor connected between said second node and said reference voltage source, said second transistor having a gate connected to said clock source.

5. A parity circuit as set forth in claim 4 including:
    a. fifth and sixth field effect transistors commonly connected at one electrode to said first node and respectively being connected at the other electrode to third and fourth nodes, said fifth and sixth transistors respectively having gates for receiving a third input signal and the complement of said third signal; and
    b. seventh and eighth field effect transistors commonly connected at one electrode to said second node and respectively being connected at the other electrode to said third and fourth nodes, said seventh and eighth transistors respectively having gates for receiving the complement of said third signal and said third signal; and c. means for precharging said third and fourth nodes to a reference negative voltage simultaneously with application of said third signal whereby either said third node or said fourth node will be selectively discharged in response to the logic level of said third signal said discharged node respectively corresponding to uneven parity and even parity.

6. A parity circuit as set forth in claim 5 wherein said means for precharging said third and fourth nodes comprises a field effect transistor connected between each node and said negative reference voltage, having a gate for receiving said first clock signal.

* * * * *